F. P. GOEHRING.
VEHICLE WHEEL CASING AND TIRE PROTECTOR.
APPLICATION FILED AUG. 20, 1917.
1,296,502. Patented Mar. 4, 1919.
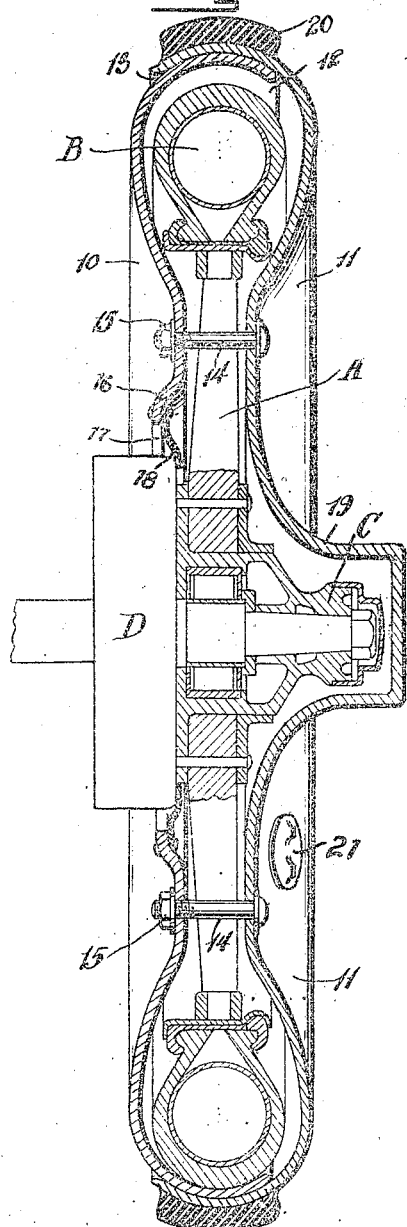
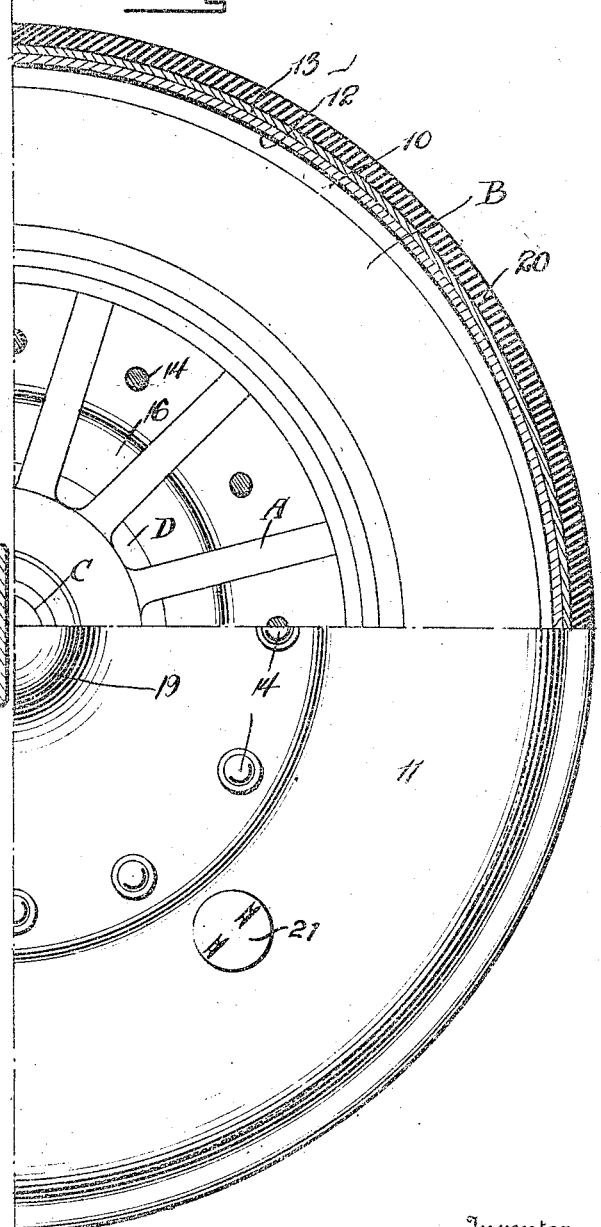
Inventor
Frank P. Goehring

UNITED STATES PATENT OFFICE.

FRANK P. GOEHRING, OF RICHMOND, MINNESOTA.

VEHICLE-WHEEL CASING AND TIRE-PROTECTOR.

1,296,502.

Specification of Letters Patent. Patented Mar. 4, 1919.

Application filed August 20, 1917. Serial No. 187,309.

*To all whom it may concern:*

Be it known that I, FRANK P. GOEHRING, a citizen of the United States, and a resident of Richmond, in the county of Stearns and State of Minnesota, have invented a certain new and useful Improvement in Vehicle-Wheel Casings and Tire-Protectors, of which the following is a specification.

The present invention relates to vehicle wheels, and has more particular reference to a device for protecting the wheel and the tire.

An object of the present invention is to provide a simply and economically constructed device adapted for application to carrier wheels of motor vehicles and the like for completely inclosing the wheels to protect the same, and to inclose the tire of the wheels and provide a protecting tread portion therefor; to provide a device having an inner smooth tread portion adapted to engage the tread portion of the tire and prevent undue wear thereon, prevent puncturing of the tire, and to prevent blowouts.

The invention further aims at the provision of a casing and protector of this character which may be made in two parts adapted to be positioned against the opposite sides of the wheel and the tire and means for securing the parts in interlocking engagement at the tread portion of the tire, the device presenting inner and outer sections, the outer one of which may be readily removed when it is necessary to gain access to the wheel and the tire.

The above, and various other objects and advantages of this invention will be in part described, and in part understood, from the following detailed description of the present preferred embodiment, the same being illustrated in the accompanying drawing wherein:

Figure 1 is a transverse sectional view through a casing and protector constructed according to the present invention and as applied to a vehicle wheel and tire.

Fig. 2 is a side elevation, partly in section, of a portion of the protector and casing, showing the wheel and tire mounted therein.

Referring to this drawing, A designates a wheel body of any suitable construction provided with a pneumatic tire B thereon, having an outwardly projecting hub C, and provided with a brake drum or the like D.

The casing and protector comprises a pair of opposed lateral complemental sections 10 and 11 which are preferably constructed from sheet or spring steel, and which are provided at their outer marginal edge portions with arcuate flanges 12 and 13, respectively, adapted to overlap when the sections are assembled, and which extend annularly about the casing or protector. The intermediate portion of the casing or protector is reduced in width to conform substantially to the width of the spokes of the wheel body A, and a plurality of clamping bolts 14 are secured through this contracted portion of the casing, and extend between the spokes of the wheel body. The threaded ends of the bolts 14 preferably project inwardly, or from the inner side of the casing, and are provided with clamping nuts 15 adapted to bind against the inner sections 10 and draw the sections together. The outer section 11 may be provided with a detachable closure plate 21 upon the removal of which access may be had to the usual air valve.

The section 10 is adapted particularly for engagement against the inner side of the wheel body A, and is provided at its central portion with an outwardly pressed or bulged flange 16 adapted to encircle the drum D of the wheel A. The flange 16 is provided with a relatively large axial opening 17 through which the drum and the axle of the wheel may project, and which is partly closed by the provision of a flexible washer or apron 18 secured to the drum part 16 adjacent the marginal edge of the opening 17, and having a relatively small opening through its central portion through which the drum of the wheel may project. The apron or dust cap 18 is adapted to exclude dust and other foreign substances from the drum D and the adjacent parts thereof. It is of course understood that the cap 18 is given suitable configuration for accommodating connecting rods and the like which pass through the drum D.

The outer section 11 is provided centrally with a hub part 19 adapted to inclose the hub D to exclude dust, dirt and the like from the hub and the surrounding parts of the wheel A, and is given any suitable fanciful configuration for imparting an attractive appearance to the protector and affording ample room for the vibration of the hub.

The flanges 12 and 13, which are preferably arcuate as above described, are adapted to overlap at the tread portion of the wheel and to resiliently interlock so as to hold the sections 10 and 11 yieldably together. The outer flange 13 may be provided upon its outer peripheral face with a tread strip 20 of rubber or the like for contact with the roadway to absorb a certain amount of shock and to also deaden the noise of the running of the wheels. It will be observed that the casing or protector is of slightly greater diameter than that of the adjacent parts of the drum D and the wheel and tire so that the tire B has freedom of movement in the operation of the wheel and frictional contact is reduced to a minimum. The tire B therefore contacts with the casing or protector substantially only at the bottom thereof when the wheel is supporting a load and engaging the roadway, the protector providing an annular endless track for supporting the tire B and preventing contact of the tire with sharp stones and other projections in the roadway tending to cut, chafe and otherwise injure the tire. The intermediate portions of the sections 10 and 11, particularly, are resilient and are adapted to conform to a large extent with the flexing of the tire B, and to accommodate the casing or protector to lateral thrust placed upon the same. As the bolts 14 pass between the spokes of the wheel body A the bolts hold the protector from turning about the wheel and insure the rotation of the protector with the wheel. The outer or tread portion of the protector is enlarged or bulged annularly and at opposite sides to simulate the contour of the tire B and admit of the free flexing and movement of the tire B therein. The protector is adapted not only to exclude dirt, dust and the like from the parts of the wheel body A and the tire B, but to also prevent the unlawful removal of the tire B or the wheel, and to prevent tampering with the tire and the wheel parts.

It is of course understood that the above specifically described sections or disk may be modified in construction and design within the spirit of this invention, and within the scope of the following claims.

I claim:—

1. The combination with a vehicle wheel having an ordinary pneumatic tire thereon, of a casing for the wheel comprising an inner and outer plate shaped to house the wheel, the edges of said plates rolled inwardly for overlapping engagement and to conform to the configuration of the tread of the pneumatic tire, bolts extending through said plates between the adjacent spokes of the wheel to bind said ends in overlapping engagement and whereby limited circumferential movement of the wheel within the casing will be permitted, the internal diameter of the casing being greater than the external diameter of the wheel to permit limited radial movement of the wheel within the casing.

2. The combination with a vehicle wheel having a brake drum at the hub portion thereof to one side of the wheel, of a casing mounted about the wheel, to permit limited circumferential and radial movement of the wheel within the casing, the casing provided with an axial opening for receiving the brake drum, a flexible apron secured to the inner surface of said casing about said opening and having its free edge engaging between the said brake drum and wheel to maintain a dust tight closure for the axial opening upon movement of the wheel within the casing, said casing offset outwardly about said opening for urging said apron against the inner surface of said brake drum.

FRANK P. GOEHRING.